United States Patent [19]

Hellring et al.

[11] Patent Number: 5,174,980
[45] Date of Patent: Dec. 29, 1992

[54] SYNTHESIS OF CRYSTALLINE ZSM-35

[75] Inventors: Stuart D. Hellring, Yardley, Pa.; Randy F. Striebel, Mt. Holly, N.J.

[73] Assignee: Mobil Oil Corp., Fairfax, Va.

[21] Appl. No.: 771,571

[22] Filed: Oct. 4, 1991

[51] Int. Cl.$^5$ ............................................. C01B 33/34
[52] U.S. Cl. ..................................... 423/706; 502/77; 423/707
[58] Field of Search ............... 423/277, 279, 305, 306, 423/326, 328, 329, 370; 502/77

[56] References Cited

U.S. PATENT DOCUMENTS

| | | | |
|---|---|---|---|
| 4,000,248 | 12/1976 | Martin | 423/329 |
| 4,016,245 | 4/1977 | Plank et al. | 423/328 |
| 4,046,859 | 9/1977 | Plank et al. | 423/328 |
| 4,107,195 | 8/1978 | Rollman | 260/448 |
| 4,151,189 | 4/1979 | Rubin et al. | 260/448 C |
| 4,251,499 | 2/1981 | Nanne et al. | 423/329 |
| 4,296,083 | 10/1981 | Rollmann | 423/329 |
| 4,323,481 | 4/1982 | Kaduk | 252/455 Z |
| 4,377,502 | 3/1983 | Klotz | 252/455 Z |
| 4,390,457 | 6/1983 | Klotz | 252/455 Z |
| 4,439,409 | 3/1984 | Puppe et al. | 423/328 |
| 4,578,259 | 3/1986 | Morimoto et al. | 423/329 |
| 4,584,286 | 4/1986 | Valyocsik | 502/62 |
| 4,695,440 | 9/1987 | Morimoto et al. | 423/328 |
| 4,721,607 | 1/1988 | Haddad et al. | 423/277 |
| 4,855,270 | 8/1989 | Haddad et al. | 502/64 |
| 4,925,548 | 5/1990 | Rubin | 208/46 |
| 4,954,325 | 9/1990 | Rubin et al. | 423/328 |
| 4,981,663 | 1/1991 | Rubin | 423/277 |

OTHER PUBLICATIONS

Lok, B. M., "The role of organic molecules in molecular sieve synthesis", Zeolites, vol. 3, p. 282 (1983).

Primary Examiner—R. Bruce Breneman
Attorney, Agent, or Firm—Alexander J. McKillop; Charles J. Speciale; Dennis P. Santini

[57] ABSTRACT

This invention relates to a new form of crystalline material identified as having the structure of ZSM-35, to a new and useful method for synthesizing said crystalline material and to use of said crystalline material prepared in accordance herewith as a catalyst for organic compound, e.g. hydrocarbon compound, conversion.

17 Claims, No Drawings

SYNTHESIS OF CRYSTALLINE ZSM-35

BACKGROUND OF THE INVENTION

1. Field of the Invention

This invention relates to a new and useful method for synthesizing a highly siliceous form of crystalline ferrierite-type material identified as having a ZSM-35 structure, the new ZSM-35 synthesized, and use of the crystalline material synthesized in accordance herewith as a catalyst component for organic compound, e.g. hydrocarbon compound, conversion.

More particularly, this invention relates to a method for preparing the crystalline ZSM-35 structure whereby synthesis is facilitated and reproducible and the product exhibits high purity and catalytic utility.

2. Discussion of the Prior Art

Ferrierite is a naturally occurring zeolite with an intersecting 10-ring by 8-ring structure. ZSM-35 is shown to be synthesized from reaction mixtures containing ethylene diamine or pyrrolidine directing agent in U.S. Pat. Nos. 4,016,245 and 4,107,195. Synthetic ferrierite is directed from a certain reaction mixture in U.S. Pat. No. 4,000,248 containing N-methylpyridinium; and another reaction mixture containing choline in U.S. Pat. No. 4,046,859. Piperidine is the directing agent in U.S. Pat. No. 4,251,499 for synthetic ferrierite. U.S. Pat. Nos. 4,323,481 and 4,390,457 teach synthesis of ferrierite from reaction mixtures comprising directing agents of 2,4-pentanedione and 2-aminopyridine, respectively. U.S. Pat. No. 4,377,502 shows morpholine or dioxane used as directing agent for ferrierite synthesis. U.S. Pat. No. 4,584,286 teaches a method for synthesis of ZSM-35 from a reaction mixture comprising bis(N-methylpyridyl) ethylinium as directing agent. Both U.S. Pat. Nos. 4,578,259 and 4,695,440 show use of pyridine plus ethylene glycol as directing agent for synthetic ferrierite; and both U.S. Pat. Nos. 4,721,607 and 4,855,270 show use of pyridine plus ethylene diamine and ethanol as directing agent for synthetic ferrierite. U.S. Pat. No. 4,925,548 teaches synthesis of ZSM-35 with hexamethyleneimine directing agent.

The above disclosures are incorporated herein by reference as to ZSM-35, synthetic ferrierite and their synthesis.

Various organic directing agents are taught for synthesis of various crystalline materials. For example, U.S. Pat. No. 4,139,600 teaches a method for synthesis of zeolite ZSM-5 from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

Piperidine is disclosed as an organic directing agent for mordenite synthesis by P. A. Jacobs and J. A. Martens, *Studies of Surface Science and Catalysis*, 33, 12 (1987); and 2-amino-pyridine is taught for this purpose in U.S. Pat. No. 4,390,457. Tetra-n-propylammonium salts are taught to be mordenite directing agents in U.S. Pat. Nos. 4,707,345 and 4,788,380.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonium hydroxide, and ethanol, ammonium hydroxide and ZSM-5 seeds. U.S. Pat. No. 4,100,262 teaches synthesis of ZSM-5 from a reaction mixture comprising a tetraalkylammonium source and a tetraureacobalt (II) complex.

Lok et al. (3 *Zeolites*, 282–291 (1983)) teach numerous organic compounds which act as directing agents for synthesis of various crystalline materials, such as, for example, ZSM-5, ZSM-11, ZSM-12, ZSM-20, ZSM-35, ZSM-48, AlPO$_4$-5, AlPO$_4$-8, AlPO$_4$-20 and others. The article does not show the presently required organic for synthesis of ZSM-35. The article does show that cyclohexylamine, N-methylcyclohexylamine, dicyclohexylamine and ethyl-n-butylamine may direct synthesis of AlPO$_4$-5 (U.S. Pat. No. 4,310,440).

The zeolitic compositions labeled PSH-3 in U.S. Pat. No. 4,439,409 are synthesized from reaction mixtures containing hexamethyleneimine as directing agent. U.S. Pat. No. 4,954,325 utilizes hexamethyleneimine in another reaction mixture to direct synthesis of MCM-22. That organic is used in U.S. Pat. No. 4,981,663 for synthesis of yet another crystalline structure labelled MCM-35. As mentioned above, ZSM-35 is directed by this same compound in U.S. Pat. No. 4,925,548.

Other publications teaching various organic directing agents for synthesis of various crystalline materials include, for example, U.S. Pat. No. 4,592,902, teaching use of an alkyltropinium directing agent, alkyl being of 2 to 5 carbon atoms, for synthesis of ZSM-5; U.S. Pat. No. 4,640,829, teaching use of dibenzyldimethylammonium directing agent for synthesis of ZSM-50; U.S. Pat. No. 4,637,923, teaching use of $(CH_3)_2(C_2H_5)N^+(CH_2)_4N^+(C_2H_5)(CH_3)_2$ directing agent for synthesis of another novel zeolite; U.S. Pat. No. 4,585,747, teaching use of bis (N-methylpyridyl) ethylinium directing agent for synthesis of ZSM-48; U.S. Pat. No. 4,585,746, teaching use of bis (N-methylpyridyl) ethylinium directing agent for synthesis of ZSM-12; U.S. Pat. No. 4,584,286, mentioned above, teaching use of bis (N-methylpyridyl) ethylinium directing agent for synthesis of ZSM-35; U.S. Pat. No. 4,568,654, teaching use of cobalticinium, dimethylpiperidinium, trimethylene bis trimethylammonium or tetramethylpiperazinium directing agents for synthesis of ZSM-51; U.S. Pat. No. 4,559,213, teaching use of DABCO-C$_{4-10}$-diquat directing agent for synthesis of ZSM-12; U.S. Pat. No. 4,482,531, teaching synthesis of ZSM-12 with a DABCO-C$_n$-diquat, n being 4,5,6 or 10, directing agent; and U.S. Pat. No. 4,539,193, teaching use of bis (dimethylpiperidinium) trimethylene directing agent for synthesis of ZSM-12.

Various diquaternary ammonium compounds have been identified as directing agents for a particular assortment of crystalline materials. For instance, U.S. Pat. Nos. 4,490,342 and 4,619,820 show synthesis of ZSM-23 from a reaction mixture containing the organic of U.S. Pat. No. 4,531,012, i.e. $(CH_3)_3N^+(R)N^+(CH_3)_3$, where R is a saturated or unsaturated hydrocarbon having 7 carbon atoms. U.S. Pat. No. 4,665,250 teaches the use of linear diquaternary ammonium compounds of the structure $(CH_3)_3N^+(CH_2)_mN^+(CH_3)_3$, m being 5, 6, 8, 9 or 10, for synthesis of ZSM-48. U.S. Pat. No. 4,623,527 teaches numerous diquaternary ammonium compounds and shows use of $(CH_3)_3N^+(CH_2)_7N^+(CH_3)_3$ directing agent for synthesis of MCM-10.

U.S. Pat. No. 4,632,815 teaches numerous diquaternary ammonium compounds and shows use of $(CH_3)_3N^+(CH_2)_4N^+(CH_3)_3$ to direct synthesis of a Silica-X structure type. U.S. Pat. No. 4,585,639 teaches use of the diquaternary $(C_2H_5)(CH_3)_2N^+(CH_2)_{4 or 6}N^+(CH_3)_2(C_2H_5)$ as directing agent for synthesis of ZSM-12. Synthesis of ZSM-5 is directed by the diquaternary $(alkyl)_3N^+(CH_2)_6N^+(alkyl)_3$, alkyl being propyl or butyl, in U.S. Pat. No. 4,585,638.

EPA 42,226 and U.S. Pat. No. 4,537,754 teach existence of numerous diquaternary ammonium compounds, but show use of $(CH_3)_3N^+(CH_2)_6N^+(CH_3)_3$ as directing agent for synthesis of EU-1. EPA 51,318 teaches use of the same diquaternary for synthesis of TPZ-3. It is noted that EU-1, TPZ-3 and ZSM-50 (synthesized with dibenzyldimethylammonium directing agent) have the same structure.

Applicants know of no prior art method for preparing a highly siliceous crystalline ferrierite-type structure identified as ZSM-35 utilizing the present method.

SUMMARY OF THE INVENTION

An economical and reproducible method for preparing a crystalline material identified as ZSM-35 exhibiting high purity, catalytic activity and other valuable properties is provided. The method comprises forming a reaction mixture hydrogel containing sources of alkali or alkaline earth metal (M) cations; an oxide of trivalent element (X), e.g. aluminum, boron, iron, gallium, indium and mixtures thereof; an oxide of tetravalent element (Y), e.g. silicon, germanium, tin and mixtures thereof; a directing agent (R) of 4-aminocyclohexanol; and water, said reaction mixture having a composition in terms of mole ratios, within the following ranges:

| Reactants | Useful | Preferred |
| --- | --- | --- |
| $YO_2/X_2O_3$ | 1 to 100 | 10 to 50 |
| $H_2O/YO_2$ | 10 to 100 | 15 to 50 |
| $OH^-/YO_2$ | 0 to 0.25 | 0 to 0.1 |
| $M/YO_2$ | 0 to 2.0 | 0.10 to 1.0 |
| $R/YO_2$ | 0.18 to 2.0 | 0.18 to 1.0 |

The method further comprises maintaining the reaction mixture until crystals of ZSM-35-type structure are formed. Reaction conditions required consist of heating the foregoing reaction mixture to a temperature of from about 100° C. to about 200° C. for a period of time of from about 10 hours to about 10 days. A more preferred temperature range is from about 130° C. to about 180° C. with the amount of time at a temperature in such range being from about 2 days to about 8 days. The solid product comprising ZSM-35 crystals is recovered from the reaction medium, as by cooling the whole to room temperature, filtering and water washing.

EMBODIMENTS

The particular effectiveness of the presently required organic directing agent, i.e. 4-aminocyclohexanol, when compared with other directing agents, such as those identified above, for the present synthesis is believed due to its ability to function as a template in the nucleation and growth of ZSM-35 crystals from the above low $YO_2$, e.g. $SiO_2$, low alkalinity, e.g. low $OH^-/YO_2$, reaction mixture. This is true even though no predigestion of the gel is required prior to crystallization. This different organic agent functions in this fashion in the reaction mixture having the above described composition and under the above described conditions of temperature and time. The reaction mixture required for this invention is X-rich, e.g. aluminum-rich, with a $YO_2/X_2O_3$ molar ratio of from about 1/1 to about 100/1, preferably from about 10/1 to about 50/1, most preferably from about 10/1 to about 30/1.

It should be noted that the ratio of components of the reaction mixture required herein are critical to achieve maximum effectiveness. For instance, if the $YO_2/X_2O_3$ ratio is above about 100, something other than ZSM-35-type crystal will form. In general, with higher $YO_2/X_2O_3$ ratios in the reaction mixture, crystallization of layered material increases and ZSM-35 decreases. Further, at $YO_2/X_2O_3$ molar ratios less than about 100/1, the $R/YO_2$ mole ratio minimum for most successful ZSM-35 synthesis is about 0.18/1. When this ratio drops below about 0.18 at the $YO_2/X_2O_3$ ratios of, for example, 21 or less, mixtures of layered and amorphous materials comprise the product. Still further, for most effective synthesis of ZSM-35 by this method, the $OH^-/YO_2$ ratio should not be less than 0.

The synthesis of the present invention is facilitated when the reaction mixture comprises seed crystals, such as those having the structure of ZSM-35. The use of at least 0.01%, preferably about 0.10%, and even more preferably about 1% seed crystals (based on total weight) of crystalline material will be useful.

The reaction mixture composition for the synthesis of ZSM-35-type crystals hereby can be prepared utilizing materials which can supply the appropriate oxide. The useful sources of $X_2O_3$, e.g. aluminum oxide, iron oxide and/or boron oxide, include, as non-limiting examples, any known form of such oxide, e.g. aluminum oxide or hydroxide, organic or inorganic salt or compound, e.g. alumina, aluminates and borates. The useful sources of $YO_2$, e.g. silicon oxide, include, as non-limiting examples, known forms of such oxide, e.g. silicic acid or silicon dioxide, alkoxy- or other compounds of silicon, including silica gel and silica hydrosol.

It will be understood that each oxide component utilized in the reaction mixture for this synthesis can be supplied by one or more essential reactants and they can be mixed together in any order. For example, any oxide can be supplied by an aqueous solution. The reaction mixture can be prepared either batchwise or continuously. Crystal size and crystallization time for the product composition comprising the ZSM-35 crystals will vary with the exact nature of the reaction mixture employed within the above limitations.

The 4-aminocyclohexanol directing agent for use herein has a formula $C_6H_{13}NO$, and may be structurally represented as follows:

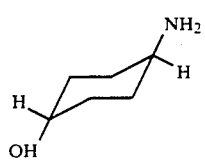

The source of the directing agent may be, for example, the hydrohalide, e.g. chloride or bromide. The cis- or transisomers may be used in combination or individually.

The ZSM-35 crystal composition prepared hereby has a characteristic X-ray diffraction pattern, including values substantially as set forth in Table 1, hereinafter.

TABLE 1

| Interplanar d-Spacing (A) | Relative Intensity ($I/I_o$) |
|---|---|
| 11.40 ± 0.1 | w |
| 9.55 ± 0.2 | m-s |
| 7.07 ± 0.05 | m |
| 6.97 ± 0.02 | w-m |
| 6.62 ± 0.03 | w-m |
| 5.79 ± 0.05 | w |
| 5.69 ± 0.03 | w |
| 4.00 ± 0.02 | s |
| 3.95 ± 0.02 | m |
| 3.87 ± 0.03 | w |
| 3.78 ± 0.03 | m |
| 3.68 ± 0.03 | w |
| 3.55 ± 0.03 | vs |
| 3.48 ± 0.02 | s |
| 3.40 ± 0.05 | w |
| 3.31 ± 0.03 | w-m |
| 3.15 ± 0.03 | w-m |
| 3.07 ± 0.03 | w |
| 2.87 ± 0.04 | w |

These X-ray diffraction data were collected with a Rigaku diffraction system, equipped with a graphite diffracted beam monochromator and scintillation counter, using copper K-alpha radiation. The diffraction data were recorded by step-scanning at 0.02 degrees of two-theta, where theta is the Bragg angle, and a counting time of 1 second for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (75-100), s=strong (50-74), m=medium (25-49) and w=weak (0-24). It should be understood that diffraction data listed for this sample as single lines may consist of multiple overlapping lines which under certain conditions, such as differences in crystallite sizes or very high experimental resolution or crystallographic change, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

The crystalline ZSM-35 prepared hereby has a composition involving the molar relationship:

$$X_2O_3:(y)YO_2$$

wherein X is a trivalent element, such as aluminum, boron, iron, indium and/or gallium, preferably aluminum; Y is a tetravalent element, such as silicon, tin and/or germanium, preferably silicon; and y is from about 1 to about 100, usually from about 10 to about 50, more usually from about 10 to about 30. In the as-synthesized form, the crystalline material has a formula, on an anhydrous basis and in terms of moles of oxides per y moles of $YO_2$, as follows:

$$(0.4 \text{ to } 0.6)M_2O:(0.4 \text{ to } 0.6)R:X_2O_3:(y)YO_2$$

wherein M and R are as defined above. The M and R components are associated with the material as a result of their presence during crystallization, and are easily removed by post-crystallization methods hereinafter more particularly described.

Synthetic ZSM-35-type crystals prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the ZSM-35 such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

Synthetic ZSM-35 crystals, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized ZSM-35 can be prepared by heating same at a temperature of from about 20° C. to about 550° C. for from 1 hour to about 48 hours.

The original cations, e.g. alkali or alkaline earth metal, of the as-synthesized material can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the material catalytically active, especially for certain hydrocarbon conversion reactions. These include hydrogen, rare earth metals and metals of Groups IIA, IIIA, IVA, IB, IIB, IIIB, IVB and VIII of the Periodic Table of the Elements, especially gallium, indium and tin.

Typical ion exchange technique would be to contact the synthetic ZSM-35 material with a salt of the desired replacing cation or cations. Examples of such salts include the halides, e.g. chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the ZSM-35 is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

The crystalline ZSM-35 prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline material can be extruded before drying or dried or partially dried and then extruded.

In the case of many catalysts, it is desired to incorporate the crystals hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina, titania and/or zirconia. The latter may be either naturally occurring or in the form of gelatinous precipitates, sols or gels including mixtures of silica and metal oxides. Use of a material in conjuction with the ZSM-35, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength because in a petroleum refinery the catalyst is often subjected to rough handling, which tends to break the catalyst down into powder-like materials which cause problems in processing.

Naturally occurring clays which can be composited with the hereby synthesized crystalline material include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the present crystals can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalytically active form of the catalyst of this invention which may contain additional hydrogenation components, reforming stocks can be reformed employing a temperature between about 370° C. and about 540° C. The pressure can be between about 100 psig and about 1000 psig, but it is preferably between about 200 psig and about 700 psig. The liquid hourly space velocity is generally between about 0.1 and about 10 $hr^{-1}$ preferably between about 0.5 and about 4 $hr^{-1}$, and the hydrogen to hydrocarbon mole ratio is generally between about 1 and about 20, preferably between about 4 and about 12.

The catalyst can also be used for hydroisomerization of normal paraffins, when provided with a hydrogenation component, e.g. platinum. Hydroisomerization is carried out at a temperature between about 90° C. and 375° C., preferably about 145° C. to about 290° C., with a liquid hourly space velocity between about 0.01 and about 2 $hr^{-1}$, preferably between about 0.25 and about 0.50 $hr^{-1}$, employing hydrogen such that the hydrogen to hydrocarbon mole ratio is between about 1:1 and about 5:1.

The catalyst can also be used for reducing the pour point of gas oils. This reaction may be conducted at a liquid hourly space velocity between about 10 and about 30 $hr^{-1}$ and at a temperature between about 400° C. and about 540° C.

Other reactions which can be accomplished employing the catalyst of this invention containing a metal, e.g. platinum, include hydrogenation-dehydrogenation reactions and desulfurization reactions.

In order to more fully illustrate the nature of the invention and the manner of practicing same, the following examples are presented. In the examples, whenever adsorption data are set forth for comparison of sorptive capacities for water, cyclohexane and n-hexane, they are determined as follows:

A weighed sample of the calcined adsorbant is contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure is kept constant (within about ±0.5 mm) by addition of absorbate vapor controlled by a manostat during the adsorption period, which does not exceed about 8 hours. As adsorbate is adsorbed by the sorbant material, the decrease in pressure causes the manostat to open a valve which admits more adsorbate vapor to the chamber to restore the above control pressures. Sorption is complete when the pressure change is not sufficient to activate the manostat. The increase in weight is calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 $sec^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

EXAMPLE 1

To water (47.248 g) was added sodium aluminate (1.444 g, technical grade, 74% solids), and sodium hydroxide (2.465 g). This mixture was stirred briefly to complete dissolution, then trans-4-aminocyclohexanol hydrochloride (7.320 g) was added. To this solution was added silica (Ultrasil, 9.149 g), and the resulting gel was transferred to a teflon liner, placed in an autoclave, pressurized (100 psig), sealed, then heated (145° C.) with stirring (~335 rpm) for 1 week. The final hydrogel is described by the mole ratios as follows:

| | |
|---|---|
| $SiO_2/Al_2O_3 =$ | 21.36 |
| $OH^-/SiO_2 =$ | 0 |
| $R/SiO_2 =$ | 0.34 |
| $H_2O/SiO_2 =$ | 19.02 |
| $Na^+/SiO_2 =$ | 0.54 |

After cooling, the product was suction filtered, washed with water, then dried (110° C., in vacuo) to give a white powder (9.066 g). The X-ray diffraction pattern ($\lambda = 1.5418$) of the product proved it to be crystalline ZSM-35, and is shown in Table 2.

A portion of the as-synthesized product of this example was calcined at 538° C. for 10 hours. Table 3 shows the X-ray diffraction pattern of this calcined ZSM-35 material.

TABLE 2

| Interplanar d-Spacing (A) | Degrees 2-Theta | Relative Intensity |
|---|---|---|
| 19.99 | 4.42 | 9.96 |
| 11.42 | 7.74 | 8.87 |
| 9.51 | 9.30 | 43.80 |
| 7.09 | 12.48 | 34.97 |
| 6.96 | 12.72 | 14.15 |
| 6.83 | 12.96 | 4.23 |
| 6.63 | 13.36 | 19.03 |
| 5.78 | 15.32 | 12.04 |
| 5.70 | 15.54 | 11.87 |
| 4.99 | 17.76 | 6.34 |
| 4.96 | 17.88 | 5.98 |
| 4.83 | 18.36 | 5.61 |
| 4.00 | 22.24 | 56.81 |
| 3.95 | 22.50 | 25.70 |
| 3.86 | 23.04 | 21.51 |
| 3.79 | 23.46 | 47.21 |
| 3.67 | 24.24 | 18.38 |
| 3.55 | 25.08 | 100.00 |
| 3.48 | 25.58 | 71.41 |
| 3.39 | 26.32 | 11.83 |
| 3.32 | 26.82 | 26.23 |
| 3.20 | 27.86 | 4.84 |
| 3.14 | 28.42 | 21.47 |
| 3.06 | 29.18 | 15.29 |
| 2.96 | 30.18 | 7.40 |
| 2.94 | 30.38 | 5.41 |
| 2.90 | 30.82 | 10.57 |
| 2.86 | 31.30 | 4.11 |
| 2.82 | 31.70 | 10.37 |
| 2.72 | 32.98 | 7.32 |
| 2.65 | 33.80 | 8.95 |
| 2.59 | 34.66 | 5.90 |

TABLE 3

| Interplanar d-Spacing (A) | Degrees 2-Theta | Relative Intensity |
|---|---|---|
| 9.51 | 9.30 | 61.03 |
| 7.08 | 12.50 | 50.89 |
| 6.96 | 12.72 | 34.11 |
| 6.61 | 13.40 | 35.47 |
| 5.76 | 15.38 | 10.10 |
| 5.67 | 15.62 | 15.60 |
| 3.99 | 22.30 | 55.25 |
| 3.94 | 22.58 | 26.69 |
| 3.85 | 23.08 | 17.64 |
| 3.78 | 23.54 | 45.11 |
| 3.72 | 23.86 | 14.51 |
| 3.66 | 24.34 | 16.46 |
| 3.54 | 25.18 | 100.00 |
| 3.47 | 25.66 | 64.48 |
| 3.42 | 26.08 | 7.19 |
| 3.38 | 26.40 | 12.19 |
| 3.31 | 26.90 | 22.37 |
| 3.13 | 28.48 | 25.42 |
| 3.05 | 29.30 | 15.19 |
| 2.95 | 30.28 | 9.28 |
| 2.89 | 30.92 | 11.32 |
| 2.83 | 31.64 | 8.82 |
| 2.71 | 33.10 | 8.28 |
| 2.64 | 33.92 | 9.37 |
| 2.58 | 34.78 | 5.32 |
| 2.57 | 34.92 | 5.09 |

The calcined product of this example has an Alpha Value of 420, and the following equilibrium adsorption capacities in grams/100 grams:

| | |
|---|---|
| $H_2O$ | 9.0 |
| Cyclohexane | 1.0 |
| n-Hexane | 5.4 |

EXAMPLE 2

To water (47.248 g) was added sodium aluminate (0.289 g, technical grade, 74% solids) and sodium hydroxide (2.443 g). This mixture was stirred briefly to complete dissolution, then trans-4-aminocyclohexanol hydrochloride (7.316 g) was added. To this solution was added silica (Ultrasil, 9.154 g), and the resulting gel was transferred to a teflon liner, placed in an autoclave, pressurized (100 psig), sealed, then heated (145° C.) with stirring (~340 rpm) for 1 week. The final hydrogel had the following composition in terms of mole ratios:

| | |
|---|---|
| $SiO_2/Al_2O_3 =$ | 101.79 |
| $OH^-/SiO_2 =$ | 0.07 |
| $R/SiO_2 =$ | 0.34 |
| $H_2O/SiO_2 =$ | 18.89 |
| $Na^+/SiO_2 =$ | 0.46 |

After cooling, the product was suction filtered, washed with water, then dried (110° C., in vacuo) to give a white powder (8.916 g). The X-ray diffraction pattern ($\lambda = 1.5418$) of the product proved it to be a layered material devoid of any ZSM-35 as shown in Table 4.

A portion of the as-synthesized product of this example was calcined at 538° C. for 10 hours. Table 5 shows the X-ray diffraction pattern of this calcined material.

TABLE 4

| Interplanar d-Spacing (A) | Degrees 2-Theta | Relative Intensity |
|---|---|---|
| 19.99 | 4.42 | 100.00 |
| 15.67 | 5.64 | 11.05 |
| 9.98 | 8.86 | 29.60 |
| 9.53 | 9.28 | 26.97 |
| 7.29 | 12.14 | 6.27 |
| 7.09 | 12.48 | 11.17 |
| 6.95 | 12.74 | 7.29 |

TABLE 4-continued

| Interplanar d-Spacing (A) | Degrees 2-Theta | Relative Intensity |
|---|---|---|
| 6.62 | 13.38 | 8.49 |
| 5.76 | 15.38 | 6.86 |
| 5.68 | 15.60 | 7.54 |
| 4.97 | 17.84 | 21.13 |
| 4.84 | 18.34 | 7.53 |
| 4.72 | 18.80 | 9.21 |
| 4.53 | 19.58 | 5.76 |
| 4.27 | 20.80 | 8.44 |
| 4.21 | 21.10 | 6.59 |
| 4.12 | 21.58 | 7.57 |
| 3.99 | 22.26 | 27.84 |
| 3.85 | 23.10 | 12.79 |
| 3.79 | 23.50 | 19.49 |
| 3.66 | 24.32 | 17.74 |
| 3.55 | 25.10 | 41.16 |
| 3.44 | 25.90 | 63.37 |
| 3.33 | 26.80 | 38.31 |
| 3.21 | 27.82 | 40.31 |
| 3.14 | 28.42 | 13.60 |
| 3.05 | 29.26 | 9.65 |
| 2.95 | 30.30 | 11.37 |
| 2.91 | 30.70 | 7.34 |
| 2.90 | 30.88 | 7.75 |
| 2.83 | 31.66 | 12.85 |
| 2.65 | 33.80 | 5.62 |

TABLE 5

| Interplanar d-Spacing (A) | Degrees 2-Theta | Relative Intensity |
|---|---|---|
| 18.18 | 4.86 | 47.66 |
| 9.37 | 9.44 | 86.34 |
| 7.02 | 12.60 | 40.21 |
| 6.91 | 12.82 | 35.98 |
| 6.60 | 13.50 | 31.89 |
| 5.62 | 15.76 | 19.33 |
| 5.38 | 16.46 | 14.89 |
| 5.01 | 17.70 | 21.79 |
| 4.71 | 18.84 | 18.56 |
| 3.96 | 22.44 | 57.36 |
| 3.91 | 22.76 | 39.47 |
| 3.82 | 23.28 | 33.54 |
| 3.75 | 23.70 | 47.44 |
| 3.64 | 24.46 | 36.47 |
| 3.52 | 25.30 | 88.35 |
| 3.45 | 25.82 | 100.00 |
| 3.39 | 26.26 | 85.50 |
| 3.30 | 27.04 | 51.79 |
| 3.21 | 27.78 | 26.71 |
| 3.12 | 28.66 | 33.37 |
| 3.03 | 29.48 | 24.43 |
| 2.96 | 30.14 | 15.38 |
| 2.94 | 30.44 | 17.51 |
| 2.88 | 31.08 | 17.93 |
| 2.82 | 31.72 | 20.55 |
| 2.63 | 34.06 | 13.49 |

EXAMPLE 3

To water (25.435 g) was added sodium aluminate (0.776 g, technical grade, 74% solids) and sodium hydroxide (0.669 g). This mixture was stirred briefly to complete dissolution, then 1.976 g of trans-4-aminocyclohexanol hydrochloride was added. To this solution was added silica (Ultrasil, 4.918 g), and the resulting gel was transferred to a teflon liner, placed in an autoclave, pressurized (100 psig), sealed, then heated (145° C.) without stirring for 1 week. The final hydrogel had the following composition in terms of mole ratios:

| | |
|---|---|
| $SiO_2/Al_2O_3 =$ | 21.36 |
| $OH^-/SiO_2 =$ | −0.04 |
| $R/SiO_2 =$ | 0.17 |
| $H_2O/SiO_2 =$ | 19.05 |
| $Na^+/SiO_2 =$ | 0.32 |

After cooling, the product was suction filtered, washed with water, then dried (110° C., in vacuo) to give a white powder (5.09 g). The X-ray diffraction pattern ($\lambda = 1.5418$) of the product proved it to be a mixed layered and amorphous material, instead of ZSM-35, as shown in Table 6.

TABLE 6

| Interplanar d-Spacing (A) | Degrees 2-Theta | Relative Intensity |
|---|---|---|
| 9.39 | 9.42 | 48.55 |
| 7.04 | 12.58 | 32.31 |
| 6.56 | 13.50 | 27.72 |
| 5.70 | 15.54 | 31.16 |
| 3.98 | 22.36 | 98.69 |
| 3.85 | 23.08 | 86.55 |
| 3.77 | 23.58 | 96.23 |
| 3.65 | 24.36 | 79.61 |
| 3.53 | 25.22 | 100.00 |
| 3.46 | 25.74 | 85.46 |
| 3.31 | 26.92 | 62.49 |
| 3.25 | 27.46 | 55.93 |
| 3.14 | 28.44 | 54.62 |
| 3.05 | 29.32 | 46.80 |
| 2.81 | 31.80 | 50.96 |

EXAMPLE 4

To water (25.429 g) was added sodium hydroxide (1.293 g). This mixture was stirred briefly to complete dissolution, then trans-4-aminocyclohexanol hydrochloride (3.921 g) was added. To this solution was added silica (Ultrasil, 4.918 g), and the resulting gel was transferred to a teflon liner, placed in an autoclave, pressurized (100 psig), sealed, then heated (145° C.) without stirring for 1 week. The final hydrogel is described by the moles ratios as follows:

| | |
|---|---|
| $SiO_2/Al_2O_3 =$ | 1745.14 |
| $OH^-/SiO_2 =$ | 0.08 |
| $R/SiO_2 =$ | 0.34 |
| $H_2O/SiO_2 =$ | 18.90 |
| $Na^+/SiO_2 =$ | 0.44 |

After cooling, the product was suction filtered, washed with water, then dried (110° C., in vacuo) to give a white powder (4.771 g). The X-ray diffraction pattern ($\lambda = 1.5418$) of the product proved it to be a layered material, instead of ZSM-35, as shown in Table 7.

TABLE 7

| Interplanar d-Spacing (A) | Degrees 2-Theta | Relative Intensity |
|---|---|---|
| 19.54 | 4.52 | 20.21 |
| 15.18 | 5.82 | 84.55 |
| 7.68 | 11.52 | 14.03 |
| 7.19 | 12.30 | 9.51 |
| 6.81 | 13.00 | 8.40 |
| 6.30 | 14.04 | 8.16 |
| 5.13 | 17.26 | 23.85 |
| 4.94 | 17.94 | 18.07 |
| 4.43 | 20.02 | 24.01 |
| 3.99 | 22.25 | 24.41 |
| 3.61 | 24.64 | 30.11 |
| 3.54 | 25.10 | 32.96 |
| 3.42 | 26.00 | 100.00 |
| 3.29 | 27.10 | 53.17 |

TABLE 7-continued

| Interplanar d-Spacing (A) | Degrees 2-Theta | Relative Intensity |
|---|---|---|
| 3.13 | 28.44 | 66.56 |
| 2.97 | 30.00 | 13.95 |
| 2.81 | 31.82 | 14.26 |
| 2.71 | 33.06 | 9.67 |
| 2.62 | 34.11 | 11.09 |
| 2.58 | 34.76 | 12.76 |

EXAMPLE 5

To water (47.208 g) was added sodium aluminate (1.443 g, technical grade, 74% solids) and sodium hydroxide (2.493 g). This mixture was stirred briefly to complete dissolution, then trans-4-aminocyclohexanol hydrochloride (7.392 g) was added. To this solution was added silica (Ultrasil, 9.179 g), and the resulting gel was transferred to a teflon liner, placed in an autoclave, pressurized (100 psig), sealed, then heated (175° C.) with stirring (~340 rpm) for 3 days. The final hydrogel is described by the moles ratios as follows:

| | |
|---|---|
| $SiO_2/Al_2O_3 =$ | 21.44 |
| $OH^-/SiO_2 =$ | 0 |
| $R/SiO_2 =$ | 0.34 |
| $H_2O/SiO_2 =$ | 18.94 |
| $Na^+/SiO_2 =$ | 0.54 |

After cooling, the product was suction filtered, washed with water, then dried (110° C., in vacuo) to give a white powder (8.223 g). The X-ray diffraction pattern ($\lambda = 1.5418$) of the product proved it to be crystalline ZSM-35, as shown in Table 8.

A portion of the as-synthesized product of this example was calcined at 538° C. for 10 hours. Table 9 shows the X-ray diffraction pattern of this calcined ZSM-35 material.

TABLE 8

| Interplanar d-Spacing (A) | Degrees 2-Theta | Relative Intensity |
|---|---|---|
| 11.36 | 7.78 | 7.99 |
| 9.51 | 9.30 | 48.76 |
| 9.08 | 9.74 | 5.57 |
| 7.09 | 12.48 | 37.32 |
| 6.97 | 12.70 | 12.78 |
| 6.62 | 13.38 | 17.53 |
| 5.79 | 15.30 | 12.22 |
| 5.68 | 15.60 | 12.97 |
| 4.97 | 17.84 | 5.13 |
| 4.84 | 18.34 | 5.27 |
| 4.52 | 19.64 | 3.04 |
| 4.26 | 20.84 | 5.48 |
| 4.00 | 22.24 | 58.61 |
| 3.95 | 22.52 | 25.28 |
| 3.86 | 23.04 | 21.35 |
| 3.79 | 23.48 | 50.19 |
| 3.74 | 23.76 | 8.34 |
| 3.67 | 24.26 | 19.19 |
| 3.55 | 25.10 | 100.00 |
| 3.48 | 25.58 | 65.35 |
| 3.39 | 26.30 | 13.59 |
| 3.35 | 26.60 | 22.17 |
| 3.32 | 26.84 | 26.69 |
| 3.21 | 27.74 | 1.06 |
| 3.14 | 28.42 | 19.67 |
| 3.06 | 29.22 | 17.98 |
| 2.96 | 30.20 | 7.34 |
| 2.94 | 30.38 | 4.63 |
| 2.90 | 30.82 | 10.67 |
| 2.85 | 31.38 | 3.82 |
| 2.82 | 31.70 | 3.91 |
| 2.82 | 31.72 | 3.91 |

TABLE 8-continued

| Interplanar d-Spacing (A) | Degrees 2-Theta | Relative Intensity |
|---|---|---|
| 2.71 | 33.02 | 6.14 |
| 2.65 | 33.80 | 9.13 |
| 2.62 | 34.22 | 2.91 |
| 2.59 | 34.66 | 5.55 |

TABLE 9

| Interplanar d-Spacing (A) | Degrees 2-Theta | Relative Intensity |
|---|---|---|
| 9.51 | 9.30 | 83.69 |
| 9.08 | 9.74 | 9.34 |
| 7.08 | 12.50 | 55.21 |
| 6.96 | 12.72 | 37.95 |
| 6.61 | 13.40 | 38.84 |
| 5.77 | 15.36 | 11.26 |
| 5.67 | 15.64 | 17.12 |
| 4.76 | 18.66 | 4.74 |
| 4.27 | 20.80 | 6.90 |
| 3.99 | 22.30 | 61.59 |
| 3.94 | 22.58 | 31.95 |
| 3.85 | 23.10 | 20.55 |
| 3.78 | 23.56 | 50.29 |
| 3.73 | 23.84 | 11.96 |
| 3.66 | 24.32 | 19.23 |
| 3.54 | 25.18 | 100.00 |
| 3.47 | 25.66 | 66.30 |
| 3.35 | 26.58 | 24.53 |
| 3.31 | 26.92 | 25.39 |
| 3.22 | 27.66 | 5.07 |
| 3.13 | 28.50 | 25.34 |
| 3.05 | 29.28 | 17.65 |
| 2.95 | 30.28 | 9.24 |
| 2.89 | 30.94 | 12.26 |
| 2.71 | 33.10 | 7.39 |
| 2.64 | 33.92 | 8.75 |
| 2.58 | 34.82 | 5.36 |

The calcined product of this example proves to have an Alpha Value of 420, the following equilibrium adsorption capacities in grams/100 grams:

| | |
|---|---|
| $H_2O$ | 9.0 |
| Cyclohexane | 1.0 |
| n-Hexane | 5.4 |

These examples demonstrate the present invention of synthesizing ZSM-35 from the required reaction mixture having a low alkalinity, low $YO_2/X_2O_3$ molar ratio and directing agent of 4-aminocyclohexanol. When the $YO_2/X_2O_3$ ratio in the reaction mixture is greater than about 100, something other than ZSM-35 forms. Synthesis conditions using a $YO_2/X_2O_3$, e.g. $SiO_2/Al_2O_3$, ratio at about 101 produced a layered material. Synthesis conditions using $YO_2/X_2O_3$, e.g. $SiO_2/Al_2O_3$, ratio near 21 with an $R/YO_2$ ratio less than 0.18 produced a mixture of layered and amorphous material instead of crystalline ZSM-35.

Changes and modifications in the specifically described embodiments can be carried out without departing from the scope of the invention which is intended to be limited only by the scope of the appended claims.

What is claimed is:

1. A method for synthesizing crystalline material exhibiting a characteristic X-ray diffraction pattern including d-spacing maxima values as follows:

| Interplanar d-spacing (A) | Relative Intensity (I/I$_o$) |
|---|---|
| 11.40 ± 0.1 | w |

-continued

| Interplanar d-spacing, (A) | Relative Intensity (I/I₀) |
|---|---|
| 9.55 ± 0.2 | m-s |
| 7.07 ± 0.05 | m |
| 6.97 ± 0.02 | w-m |
| 6.62 ± 0.03 | w-m |
| 5.79 ± 0.05 | w |
| 5.69 ± 0.03 | w |
| 4.00 ± 0.02 | s |
| 3.95 ± 0.02 | m |
| 3.87 ± 0.03 | w |
| 3.78 ± 0.03 | m |
| 3.68 ± 0.03 | w |
| 3.55 ± 0.03 | vs |
| 3.48 ± 0.02 | s |
| 3.40 ± 0.05 | w |
| 3.31 ± 0.03 | w-m |
| 3.15 ± 0.03 | w-m |
| 3.07 ± 0.03 | w |
| 2.87 ± 0.04 | w | where vs=very strong (75-100), s=strong (50-74), m=medium (25-49) and w=weak (0-24), which comprises (i) preparing a mixture capable of forming said material, said mixture comprising sources of alkali or alkaline earth metal (M), an oxide of trivalent element (X), an oxide of tetravalent element (Y), water and directing agent (R) of 4-aminocyclohexanol, and having a composition, in terms of mole ratios, within the following ranges:

| | |
|---|---|
| $YO_2/X_2O_3$ | 1 to 100 |
| $H_2O/YO_2$ | 10 to 100 |
| $OH^-/YO_2$ | 0 to 0.25 |
| $M/YO_2$ | 0 to 2.0 |
| $R/YO_2$ | 0.18 to 2.0 |

(ii) maintaining said mixture under sufficient conditions including a temperature of from about 100° C. to about 200° C. until crystals of said material are formed; and (iii) recovering said crystalline material from step (ii), said recovered crystalline material containing said R.

2. The method of claim 1 wherein said mixture has the following composition ranges:

| | |
|---|---|
| $YO_2/X_2O_3$ | 10 to 50 |
| $H_2O/YO_2$ | 15 to 50 |
| $OH^-/YO_2$ | 0 to 0.1 |
| $M/YO_2$ | 0.10 to 1.0 |
| $R/YO_2$ | 0.18 to 1.0 |

3. The method of claim 1 wherein said mixture further comprises seed crystals in sufficient amount to enhance synthesis of said crystalline material.

4. The method of claim 3 wherein said seed crystals have the structure of ZSM-35.

5. The method of claim 1 wherein said X is aluminum, boron, iron, gallium, indium or a mixture thereof, and said Y is silicon, germanium, tin or a mixture thereof.

6. The method of claim 1 wherein X comprises aluminum and Y comprises silicon.

7. A mixture capable of forming crystals of ZSM-35 structure upon crystallization, said mixture comprising sources of alkali or alkaline earth metal (M), trivalent element (X) oxide selected from the group consisting of oxide of aluminum, boron, iron, gallium, indium and mixtures thereof; tetravalent element (Y) oxide selected from the group consisting of oxide of silicon, germanium, tin and mixtures thereof; water and directing agent (R) of 4-aminocyclohexanol, and having a composition, in terms of mole ratios, within the following ranges:

| | |
|---|---|
| $YO_2/X_2O_3$ | 1 to 100 |
| $H_2O/YO_2$ | 10 to 100 |
| $OH^-/YO_2$ | 0 to 0.25 |
| $M/YO_2$ | 0 to 2.0 |
| $R/YO_2$ | 0.18 to 2.0 |

8. The method of claim 1 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

9. The method of claim 2 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

10. The method of claim 8 wherein said replacing ion is hydrogen or a hydrogen precursor.

11. The method of claim 9 wherein said replacing ion is hydrogen or a hydrogen precursor.

12. The recovered crystalline material of claim 1.

13. The recovered crystalline material of claim 2.

14. The R-containing product crystalline material of claim 8.

15. The R-containing product crystalline material of claim 9.

16. The R-containing product crystalline material of claim 10.

17. The R-containing product crystalline material of claim 11.

* * * * *

UNITED STATES PATENT AND TRADEMARK OFFICE
CERTIFICATE OF CORRECTION

PATENT NO. : 5,174,980

DATED : December 29, 1992

INVENTOR(S) : S.D. Hellring et al.

It is certified that error appears in the above-identified patent and that said Letters Patent is hereby corrected as shown below:

Col. 6, line 42          "20°C" should be --200°C--

Signed and Sealed this

Thirtieth Day of November, 1993

Attest:

BRUCE LEHMAN

*Attesting Officer*      *Commissioner of Patents and Trademarks*